United States Patent [19]

Singh

[11] 4,154,921

[45] May 15, 1979

[54] PREPARATION OF POLYESTERS

[75] Inventor: Gurdial Singh, Greenville, N.C.

[73] Assignee: E. I. Du Pont de Nemours and Company, Wilmington, Del.

[21] Appl. No.: 916,919

[22] Filed: Jun. 19, 1978

[51] Int. Cl.$^2$ ............................................. C08G 63/30
[52] U.S. Cl. ..................................... 528/275; 528/309
[58] Field of Search ........................ 528/274, 275, 309

[56] References Cited

U.S. PATENT DOCUMENTS

| | | | |
|---|---|---|---|
| 3,468,849 | 9/1969 | Rothert | 528/274 X |
| 4,057,534 | 11/1977 | Konishi et al. | 528/278 |

FOREIGN PATENT DOCUMENTS 46-37575  11/1971  Japan ........................................ 528/275

Primary Examiner—Lucille M. Phynes

[57] ABSTRACT

The formation of manganese-derivative scale in equipment involved in polyester manufacture is reduced by introduction of a sterically hindered benzoic acid in approximately stoichiometric amount. The acids include 2,6-dichloro-, 2,6-dimethyl- and 2,4,6-trimethyl-benzoic acids. The scale is believed to be insoluble manganese terephthalate, presumably formed by reaction of manganese acetate catalyst generated as a result of a side reaction during the ester exchange reaction of dimethyl terephthalate with excess ethylene glycol. Preferably an alkali metal salt of an organic acid, such as sodium acetate or lithium acetate is also used to give a synergistic effect in combination with the hindered acid.

6 Claims, No Drawings

PREPARATION OF POLYESTERS

DESCRIPTION

1. Technical Field

This invention concerns improvements in and relating to the preparation of fiber-forming polyesters, and is particularly concerned with reducing the amount of scale in equipment used therefor.

2. Background

The manufacture of poly(ethylene terephthalate) from dimethyl terephthalate and excess ethylene glycol is known from Whinfield and Dickson U.S. Pat. No. 2,465,319 and Vodonik U.S. Pat. No. 2,829,153. In this process a manganese-containing ester exchange catalyst is advantageous to promote the production of bis(hydroxyethyl) terephthalate. Bis(hydroxyethyl) terephthalate is subsequently polymerized to the higher molecular weight required for fiber formation. Hitherto, scale has formed deposits on the reaction equipment, which has to be shut down periodically for cleaning. Further, the solid particles of scale may flake off into the polymer melt, and subsequent plug the spinning filter packs.

It is known to recycle excess unpurified glycol back into this process, as suggested in British Pat. No. 996,689.

It is also known from Japanese published application 46-37575/71 that monocarboxylic acids containing 9 or less carbon atoms may be used to suppress formation of foreign substances in polyester manufacture. It is also known from Bice U.S. Pat. No. 3,391,122 to use sodium acetate, and from Konishi U.S. Pat. No. 4,057,534 to use lithium acetate in polyester manufacture.

SUMMARY OF THE INVENTION

The scale formed during manganese-catalyzed reaction between dimethyl terephthalate and glycol has been found to be primarily insoluble manganese terephthalate, presumably formed by the reaction of manganese acetate catalyst with terephthalic acid generated by hydrolysis of dimethyl terephthalate and bis(hydroxyethyl) terephthalate. The hydrolysis is believed to result from water present in unpurified glycol.

The invention provides an improvement in a process for preparing a linear fiber-forming polyester by first reacting dimethyl terephthalate with ethylene glycol in the presence of a manganese-containing ester-interchange catalyst, followed by polymerizing the resulting ester product. The improvement for reducing scale formation in the reaction equipment comprises introducing into the reaction a sterically hindered benzoic acid selected from the group consisting of 2,6-dichlorobenzoic acid, 2,6-dimethylbenzoic acid and 2,4,6-trimethylbenzoic acid in approximately stoichiometric amount with respect to the manganese catalyst to provide soluble manganese salts.

By a sterically hindered benzoic acid is meant a benzoic acid with ring-substituents in both the 2- and the 6-positions.

Preferred acids are the 2,6-dimethyl and 2,4,6-trimethylbenzoic acids, since the 2,6-dichlorobenzoic acid can cause corrosion problems in certain equipment. The preferred catalyst is manganese acetate.

In a preferred embodiment of the invention, the hindered benzoic acid is used in combination with an alkali metal salt of an organic acid.

DETAILED DESCRIPTION OF INVENTION

The process is carried out in conventional manner in most respects, except for the introduction of hindered acid. The hindered acid is preferably introduced into the feed glycol in appropriate amount.

Mole ratios of hindered acid to manganese should generally be within the range of 0.05 to 6, with 0.5 to 2 being preferred, especially 1 to 2. Too high a ratio tends to inhibit catalytic activity of the manganese. Too low a ratio is ineffective, since manganese terephthalate scale tends to form.

In addition to the hindered acid there is preferably added an alkali metal salt of an organic acid, e.g. sodium acetate. Surprisingly, the presence of both additives in combination appears to provide a synergistic effect and allows the use of a lower concentration of either inhibitor. Preferably, the amount of alkali metal salt used is in the range of 0.5 to 2 moles per mole of hindered acid.

For further details of the conventional process, reference may be made to the prior art, e.g., those references mentioned in the background herein and in Konishi et al. U.S. Pat. No. 4,057,534, Gleim et al. U.S. Pat. No. 3,661,858, and Bice et al. U.S. Pat. No 3,391,122, all of which are hereby specifically incorporated by reference. Phosphoric acid is preferably introduced to the ester product, as described by Engle et al in U.S. Pat. No. 3,028,366, to inhibit further catalytic activity of the manganese catalyst.

EXAMPLE 1

A simulated reactor scale is prepared by dissolving 8.3 g (0.05 mole) of terephthalic acid in 300 ml of boiling ethylene glycol. To the solution is added $Mn(OAc)_2 \cdot 4H_2O$ (12.25g, 0.05 mole) during stirring and under nitrogen. Manganese terephthalate separates immediately as a white precipitate. It is collected by filtration and dried overnight at 100° C. in a vacuum oven, 100% yield. The infrared spectrum confirms its identity as manganese terephthalate.

The simulated scale is used to test the antifouling activity of various benzoic acids, by refluxing a mixture of the scale (0.002 mole of manganese terephthalate) and 0.004 mole of the acid in 100 ml of ethylene glycol for 24 hours. The results are observed and tabulated below.

Table 1

| Acid | Solubility |
| --- | --- |
| Benzoic Acid | Undissolved |
| o-Hydroxybenzoic Acid | Undissolved |
| 2,6-Dihydroxybenzoic Acid | Undissolved |
| o-Methylbenzoic Acid | Undissolved |
| 2,6-Dimethylbenzoic Acid | Dissolved in 3-4 hours |
| 2,4,6-Trimethylbenzoic Acid | Dissolved in 3-4 hours |
| 2,6-Dichlorobenzoic Acid | Dissolved in 2 hours |
| o-Chlorobenzoic Acid | Only partly dissolved |

This test demonstrates that, although other sterically hindered benzoic acids are ineffective, 2,6-dichloro-, 2,6-dimethyl-, and 2,4,6-trimethylbenzoic acids, i.e., the above-mentioned sterically hindered acids, are effective in dissolving the simulated scale.

In addition, test glycol containing 2,6-dimethylbenzoic acid has been used to prepare poly(ethylene terephthalate) without apparent scale formation over a limited test period during which scale would have been expected to become significant, i.e., the test glycol containing hindered acid apparently showed reduced scale formation. The sterically hindered acids should not act as end group stabilizers for the polymer; acid residue has not been detected in polymer made from such test glycol, using NMR tecniques. Most of the hindered acid is distilled with the off-glycol, and thus is recycled in the process.

EXAMPLE 2

This example illustrates the scale-dissolving power of a preferred embodiment of the invention in which 2,4,6-trimethylbenzoic acid (TMBA) is used in combination with an alkali metal salt, sodium acetate (NaAc) or lithium acetate (LiAc). The glycol used in the example is recovered glycol which contains. by analysis, the following impurities: 1.18% water, 0.0066% phosphorus and 0.163% antimony. Percentages are by weight. The full procedure is repeated for each item in Table 2. The amounts are given in grams (g) except for the % reductions in scale.

Step 1

A 500 ml 3-neck flask is fitted with a thermometer and a steam-cooled partial condenser which has a distillation head connected to a take-off water-cooled condenser. The flask is charged with 97 g (0.5 mole) of dimethyl terephthalate (DMT) and 124 g (2 mole) of recycled glycol from a 1000 ml batch containing 1.088 g of manganese acetate ester exchange catalyst and the amounts of antifouling agents specified in Table 2. A 47 cm diameter piece of stainless steel screen with 10μ pore size is added to the flask to provide contact of reactants with metal as during actual manufacture of polyester. The flask is heated gradually to 200°–220° C. and 43 ml of methanol are distilled and collected as a by-product of ester exchange. The steam-cooled partial condenser is then removed and heating of the flask is continued while 40 ml of glycol are distilled out. Molten reaction product, bis(hydroxyethyl)terephthalate (BHET) in the amount of 32 g is then decanted from the reaction flask.

Step 2

To the reaction product remaining in the flask, are added 24.3 g of DMT and 62.2 g of catalyzed recycled glycol. The flask contents are again heated to 200°–220° C. while 11 ml of methanol is distilled and collected. The steam-cooled partial condenser is then removed and 40 ml of glycol are distilled out of the flask. Again, 32 g of reaction product are poured out of the flask.

This procedure is repeated 15 times to use all the 1000 ml of glycol.

Step 3

After the above procedure, as much molten reaction product as possible is poured out of the flask without disturbing the insoluble solid which has settled to the bottom. About 200 ml of triethylene glycol are then added to the flask to dissolve the remaining monomeric and polymeric products and the flask is heated to 165°–170° C. The liquid portion is decanted. The treatment with triethylene glycol is repeated. The solid remaining in the flask is cooled and rinsed with acetone. The solid is then collected on a filter and weighed and reported in Table 2 as amount of scale isolated. Infrared spectra analysis indicates that the scale produced is identical to scale obtained from commercially used exchange vessels.

Table 2

Effect of Antifouling Agents On Scale Formation

| Item | NaAc | TMBA | Scale Isolated | % Reduction in Scale Actual | Calc. |
|---|---|---|---|---|---|
| 1 | 0.0 | — | 0.061 | 0.0 | |
| 2 | 0.9 | — | 0.008 | 86.4 | |
| 3 | 0.6 | — | 0.017 | 72.1 | |
| 4 | 0.3 | — | 0.043 | 29.5 | |
| 5 | 0.183 | — | 0.059 | 3.0 | |
| 6 | — | 1.468 | 0.030 | 50.8 | |
| 7 | — | 0.734 | 0.045 | 26.2 | |
| 8 | — | 0.367 | 0.051 | 16.4 | |
| 9 | — | 0.183 | 0.057 | 6.6 | |
| 10 | 0.183 | 0.734 | 0.008 | 86.9 | 29.2 |
| 11 | " | 0.367 | 0.014 | 77.0 | 19.4 |
| 12 | " | 0.183 | 0.020 | 67.2 | 9.6 |
| | LiAc | | | | |
| 13 | 0.228 | — | 0.042 | 31.1 | |
| 14 | 0.228 | 0.367 | 0.013 | 78.7 | 47.5 |

The "Calc." reduction in scale is what was expected from the sum of the individual effects of the two antifouling agents at the given concentration. The data in the Table show that lesser amounts of scale were obtained than expected when a hindered acid was present in combination with an alkali metal salt.

EXAMPLE 3

This example illustrates use of the invention in a continuous process.

A continuous ester interchange reaction between dimethyl terephthalate and ethylene glycol is carried out using as the reaction vessel a 20-plate bubble-cap column similar to that disclosed in Vodonik U.S. Pat. No. 2,829,153. The overall feed mole ratio of glycol to DMT is 2.0 and all of the feed glycol used is recycle glycol which has been recovered from the vapor systems of polyester manufacturing vessels. A major portion, 82.5%, of the total glycol feed containing residual antimony catalyst (about 1200 p.p.m.) and added manganese acetate, 2,4,6-trimethyl benzoic acid and sodium acetate is fed to the column at plate 16. The remainder of the feed glycol, 17.5%, is injected into the column below plate 1 to assist in smooth reactor operation. Molten dimethyl terephthalate is supplied to the vessel at the 14th plate and control settings adjusted to provide for a 73.9 lbs./hr. polymer throughput. The calendria temperature is maintained at about 237° C., the temperature of tray No. 1 is about 206° C. and the temperature tray No. 11 is 188° C. Water and methanol are removed through the total condenser and liquid monomer is removed through a drain conduit and continuously polymerized in other vessels under conditions of elevated temperature and reduced pressure.

The above process is operated for two days with feed glycol containing 428 p.p.m., 2,4,6-trimethylbenzoic acid and 30 p.p.m. sodium (from sodium acetate), based upon weight of polymer produced. Analysis of the polymer gave a total manganese content of 137 p.p.m. based on polymer, whereas the theoretical amount present, calculated from the amount of manganese in the feed glycol, was 135 p.p.m. The slightly higher value of manganese found in the polymer versus the theoretical amount which would be expected, indicates that there is essentially no loss of manganese via the formation of new scale in the reactor.

I claim:

1. In a process for preparing a linear fiber-forming polyester by first reacting dimethyl terephthalate with ethylene glycol in the presence of a manganese-containing ester-interchange catalyst, followed by polymerizing the resulting ester product, the improvement for reducing scale formation in the reaction equipment which comprises introducing into the reaction a sterically hindered benzoic acid selected from the group consisting of 2,6-dichlorobenzoic acid, 2,6-dimethylbenzoic acid and 2,4,6-trimethylbenzoic acid in approximately stoichiometric amount to provide soluble manganese salts.

2. A process according to claim 1, wherein the amount of the hindered acid is 1 to 2 moles per mole of manganese catalyst introduced.

3. A process according to claim 1, wherein the hindered acid is 2,6-dichlorobenzoic acid.

4. A process according to claim 1, wherein the hindered acid is 2,6-dimethylbenzoic acid.

5. A process according to claim 1, wherein the hindered acid is 2,4,6-trimethylbenzoic acid.

6. A process according to claim 1, 2 or 5, wherein an alkali metal salt of an organic acid is also introduced into the reaction to reduce scale formation.

* * * * *